(12) United States Patent
Casadio et al.

(10) Patent No.: US 11,667,424 B2
(45) Date of Patent: Jun. 6, 2023

(54) LIQUID CONTAINER LABELLING MACHINE WITH OPTICAL INSPECTION DEVICE

(71) Applicant: SACMI COOPERATIVA MECCANICI IMOLA SOCIETA' COOPERATIVA, Imola (IT)

(72) Inventors: Marco Casadio, Imola (IT); Giorgia Fuschini, Imola (IT)

(73) Assignee: SACMI COOPERATIVA MECCANICI IMOLA SOCIETA COOPERATIVA, Bologna (IT)

( * ) Notice: Subject to any disclaimer, the term of this patent is extended or adjusted under 35 U.S.C. 154(b) by 0 days.

(21) Appl. No.: 16/095,491

(22) PCT Filed: Apr. 26, 2017

(86) PCT No.: PCT/IB2017/052416
§ 371 (c)(1),
(2) Date: Oct. 22, 2018

(87) PCT Pub. No.: WO2017/187367
PCT Pub. Date: Nov. 2, 2017

(65) Prior Publication Data
US 2019/0092511 A1   Mar. 28, 2019

(30) Foreign Application Priority Data

Apr. 26, 2016 (IT) .................. 102016000042572

(51) Int. Cl.
*B65C 9/06* (2006.01)
*G01N 21/90* (2006.01)
(Continued)

(52) U.S. Cl.
CPC ................ *B65C 9/067* (2013.01); *B65C 3/10* (2013.01); *B65C 9/04* (2013.01); *B65C 9/40* (2013.01);
(Continued)

(58) Field of Classification Search
CPC .. B65C 3/10; B65C 9/04; B65C 9/067; B65C 9/40; G06T 7/70; G06T 7/0004;
(Continued)

(56) References Cited

U.S. PATENT DOCUMENTS

2011/0181874 A1* 7/2011 Buchwald ............... B65C 9/067
356/239.4
2012/0147360 A1* 6/2012 Germini .................. B65C 9/067
356/138
(Continued)

FOREIGN PATENT DOCUMENTS

DE    10 2005 041 497 A1    3/2007
DE    10 2010 012 214 A1    9/2011
(Continued)

OTHER PUBLICATIONS

Translation of DE-102011007520-A1, Inventor Herbert Kolb (Year: 2012).*
(Continued)

*Primary Examiner* — George R Koch
(74) *Attorney, Agent, or Firm* — Wentsler LLC

(57) ABSTRACT

This invention relates to a machine and a method for labelling and inspecting containers for liquids, automatically applying a label on each container on a seamless zone of it, using an optical inspection device provided with an illuminator having a collimator interposed between a light generator of the illuminator and a carousel of the machine.

19 Claims, 5 Drawing Sheets

(51) Int. Cl.
   *G06V 10/145*  (2022.01)
   *G06T 7/70*    (2017.01)
   *B65C 3/10*    (2006.01)
   *B65C 9/04*    (2006.01)
   *B65C 9/40*    (2006.01)
   *G06T 7/00*    (2017.01)

(52) U.S. Cl.
   CPC ....... *G01N 21/9045* (2013.01); *G06T 7/0004* (2013.01); *G06T 7/70* (2017.01); *G06V 10/145* (2022.01); *G06V 2201/06* (2022.01)

(58) Field of Classification Search
   CPC ............. G01N 21/9045; G06K 9/2036; G06K 2209/19; G01B 11/26
   See application file for complete search history.

(56) References Cited

U.S. PATENT DOCUMENTS

2012/0314213 A1* 12/2012 Herrmann ............... B65C 9/067
                                                      356/240.1
2014/0299445 A1* 10/2014 Kolb ..................... B65G 47/244
                                                      198/376

FOREIGN PATENT DOCUMENTS

| DE | 102011007520 A1 * | 10/2012 | ............ G01B 11/26 |
| DE | 10 2014 102 450 A1 | 8/2015 | |
| EP | 2 251 268 A2 | 11/2010 | |
| JP | 2008158125 A | 7/2008 | |

OTHER PUBLICATIONS

Patent Cooperation Treaty International Search Report and Written Opinion issued in International Application No. PCT/IB2017/052416 (International Filing Date Apr. 26, 2017) dated Jul. 3, 2017 (12 pgs).
Corresponding Japanese Patent Application No. 2018-555946, Office Action dated Oct. 25, 2019. English Translation.
Corresponding Korean Patent Application No. 10-2018-7030964, Office Action dated Feb. 19, 2020. English Translation.

* cited by examiner

LIQUID CONTAINER LABELLING MACHINE WITH OPTICAL INSPECTION DEVICE

This application is a 371 of PCT/IB2017/052416, filing date Apr. 26, 2017.

TECHNICAL FIELD

This invention relates to a liquid container labelling machine equipped with an optical inspection device. The machine is a machine which automatically applies a label on each respective container on a seamless zone of the container, and the method is a method according to a possible use of such a machine.

BACKGROUND ART

Liquid containers, and in particular, bottles, are commonly made by blow moulding or forming a parison placed in a mould which in turn comprises two juxtaposed half-moulds.

After blowing, the half-moulds are moved apart to take out the bottle which, however, has a seam corresponding to the boundary between the two half-moulds. While the parison is being blown, the material it is made of abuts against the boundary line between the two half-moulds thus creating a seam at least on the outer lateral surface of the bottle.

This seam is a feature of the outer lateral surface of the bottle and applying the label to this feature may produce defects on the label itself, such as bubbles or creases.

Thus, each container is elongate along a respective longitudinal axis and has a seam lying in a seam plane containing this longitudinal axis.

Moreover, the label must be applied as uniformly as possible in such a way as to remain attached to the outside surface of the bottle with enough force sufficiently distributed over the entire attachment surface of the label.

Labelling machines are adapted to continuously receive a plurality of liquid containers, or bottles, in order to label them and move them along a path by means of a carousel.

To identify the position of the seam on each respective container, some labelling machines comprise an optical inspection system configured to capture one or more images of the container. This system comprises at least one camera to take one or more snapshots of the container and an illuminator adapted to illuminate the container while the shots are being taken.

For example, patent document DE102005041497A1 relates to a rotary labelling machine equipped with an optical system for inspecting the bottles. The optical inspection system is located, for example, outside the carousel and comprises an illuminator, to illuminate at least one sector of the path, and cameras to capture images of the containers while they are in that sector.

Patent document EP2251268A2 also describes an optical inspection system based on the projection of a grid, that forms a pattern.

In these cases, the system involves processing the images to identify the position of the seams on the containers in relation to the presence of image indicator elements.

Patent document DE102014102450 describes an optical inspection device according to a principle of transmitting light rays through the container. This solution has limitations in terms of precision and effectiveness, especially if the container or its content is dark or opaque.

This system, however, is complex in terms of image processing, and relatively unreliable, especially if the bottles are made of a dark material or are filled with a dark liquid.

Patent document US2011/0181874B2 describes a system for detecting the seam on a container and which involves projecting a light pattern on the container in such a way as to identify the position of the seam based on the distortion of the pattern caused by the reflection of the light rays incident on the seam itself.

Analysing the distortion of the pattern produced by the illuminator, however, is complex and relatively unreliable, as in the case of document DE102005041497A1.

DISCLOSURE OF THE INVENTION

This invention has for an aim to overcome the above mentioned disadvantages of the prior art by providing a container labelling machine for automatically applying a label on a seamless zone of each respective container, and a method for labelling liquid containers by automatically applying a label on a seamless zone of each respective container.

More specifically, the aim of this invention is to provide a container labelling machine for automatically applying a label on a seamless zone of each respective container, and a method for labelling containers by automatically applying a label on a seamless zone of each respective container, and which are capable of increasing the precision with which the position of at least one seam on each container is automatically detected by the machine, compared to labelling machines and methods known up to the present time.

A further aim of this invention is to provide a container labelling machine for automatically applying a label on a seamless zone of each container, and a method for labelling containers by automatically applying a label on a seamless zone of each respective container, whereby the seams on containers made of an at least partly reflective material can be detected with a high degree of precision, even where such containers contain a liquid which is at least partly dark and/or the material the containers are made of is at least partly dark.

These aims are fully achieved by the labelling machine which forms the object of this description and which is characterized by the contents of one or more of the appended claims.

Note that these containers are configured to contain a product; this product can be liquid, semi-liquid or solid. In an embodiment, they are containers for foodstuffs (exemplifying and non-limiting, in the case that the product is liquid, it may be water, milk or oil, in the case of semi-liquid or solid product, it can be jam, tuna, food paste). Containers processed by the labeling machine may be full or empty.

In one embodiment, the containers are made of glass or of plastic material, for example PET.

It should be noted that (in at least one embodiment) the containers are liquid containers; the term "liquid" means that the containers are suitable for being filled with liquids (without limiting the fact that the containers must be effectively filled with liquids, either at the time of optical inspection or afterwards).

The liquid container labelling machine comprises:
a carousel which rotates about a central axis of rotation;
a plurality of supporting elements, rotating about respective supporting axes and configured to support respective containers in rotation about respective supporting axes; these supporting axes operatively coincide with the longitudinal axes of the respective containers; the supporting elements are integral with the carousel to transport the containers along a predetermined path in rotation about the central axis;

a plurality of actuators mounted on the carousel and connected to respective supporting elements to move them about the respective supporting axes;

an optical inspection device.

In an example embodiment, the optical inspection device is located externally of the carousel. Alternatively, it might be located internally of the carousel. In an example embodiment, the optical inspection device is stationary relative to the rotating carousel.

The inspection device comprises an illuminator to light at least one sector of the path. The device comprises at least one camera to capture one or more images of the containers supported by the supporting elements in that sector. The device comprises a processing unit configured to process the images in order to identify the position of the respective seams on the containers.

The machine is characterized in that the illuminator of the optical inspection device comprises:

a light generator defining a light emitting surface;

a collimator, interposed between the light generator and the carousel; the collimator defines a lighting surface directed towards the aforementioned sector of the path; the collimator, in the context of the light rays generated by the light generator and incident upon the collimator, is configured to allow through only the rays whose inclination is less than a critical angle relative to corresponding planes which are parallel to the supporting axes and at right angles to the collimator at the respective points of incidence of the incident light rays.

According to another aspect, this description relates to a method for labelling liquid containers, each of which is elongate along a respective longitudinal axis and has at least one seam lying in a seam plane containing the respective longitudinal axis. This method comprises the following steps:

transporting a plurality of containers along a path by means of a carousel;

rotating the containers about the respective longitudinal axes while they are being transported;

lighting at least one sector of the path by means of light rays capable of lighting the containers in transit in the sector;

capturing one or more images of each respective container when it is positioned in that sector;

processing the images to derive data therefrom representing a position of the seam in the context of each respective container.

The lighting step comprises a step of generating collimated light rays in such a way that the inclination of all the illuminating rays is less than a critical angle relative to corresponding planes which are parallel to a longitudinal direction defined by the longitudinal axes of the containers and at right angles to a lighting surface facing the aforementioned sector of the path.

The at least partly reflective material of the outside surface of the container reflects one or more of the rays exiting the illuminator and also those which strike the seamless region in such a way as to produce reflected rays which "return" to the lighting surface.

To prevent the reflectance of the container material from affecting the images captured by the camera, the camera is usually located on the opposite side of the individual container with respect to the light field generated by the illuminator, and thus in such a way that the illuminator lights the container "from behind", with respect to the snapshots taken by the camera.

Moreover, if the containers contain a dark liquid or if the material of the lateral outside surface of the container is at least partly dark, the camera, in this invention is advantageously positioned on the opposite side and hence on the same side as the illuminator. More specifically, in an example embodiment, the camera may be positioned under the illuminator. The camera might, however, also be positioned above the illuminator.

The camera is directed at a sector included in the light field generated by the illuminator and forming part of the path followed by each container.

Thus, on account of these reflected rays, the snapshots taken by the camera can easily exhibit excessively light zones in the proximity of, or even at, the seam. In order to increase seam detection precision, these excessively light zones should, on the contrary, be darker.

This negatively affects the accuracy or precision with which the position of the seam is detected.

A machine according to this description advantageously makes it possible to avoid the problems caused by the reflectance of the material the container is made of, even if the camera which takes the snapshots is on the same side as the illuminator.

In an embodiment, the containers carried by the carousel are illuminated from a stationary position, relative to the movement of the containers (movement as one with to the carousel).

In an embodiment, the illuminator is positioned outside the carousel, aside from it; the illuminator is positioned stationary with respect to the carousel.

In an embodiment, images are acquired by reflection; that is, the rays generated by the illuminator are reflected from the containers and subsequently acquired. In one embodiment, the camera (or cameras) is positioned by the same part (side) of the illuminator as compared to the illuminated containers (for example above or below the illuminator). In one embodiment, said at least one sector of the path (the containers are illuminated when passing through that sector) is interposed between the center rotation axis of the carousel and the illuminator. Said at least one path sector is (also) interposed between the center rotation axis of the carousel and said (at least one) camera.

BRIEF DESCRIPTION OF DRAWINGS

This and other features of the invention will become more apparent from the following description of a preferred, non-limiting example embodiment of it, with reference to the accompanying drawings, in which.

DETAILED DESCRIPTION OF PREFERRED EMBODIMENTS OF THE INVENTION

Figure 1:
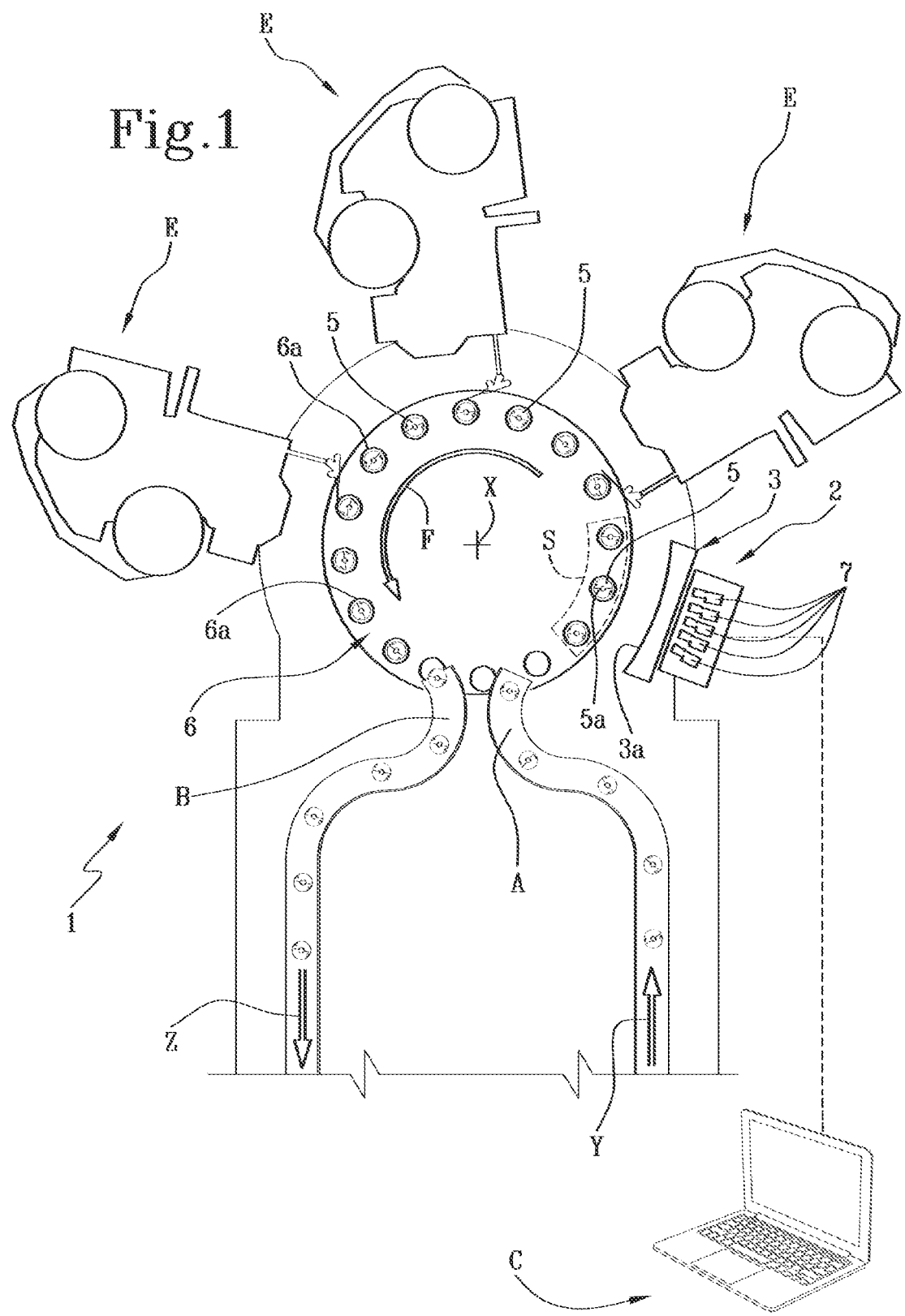
FIG. 1 shows a machine according to a possible embodiment of this description.

The numeral 1 in FIG. 1 denotes a labelling machine 1 for liquid containers 5 according to a possible embodiment of a machine according to this description.

Each of the containers 5, only some of which are shown in FIG. 1 for reasons of clarity, is elongate along a respective longitudinal axis.

Figure 3:
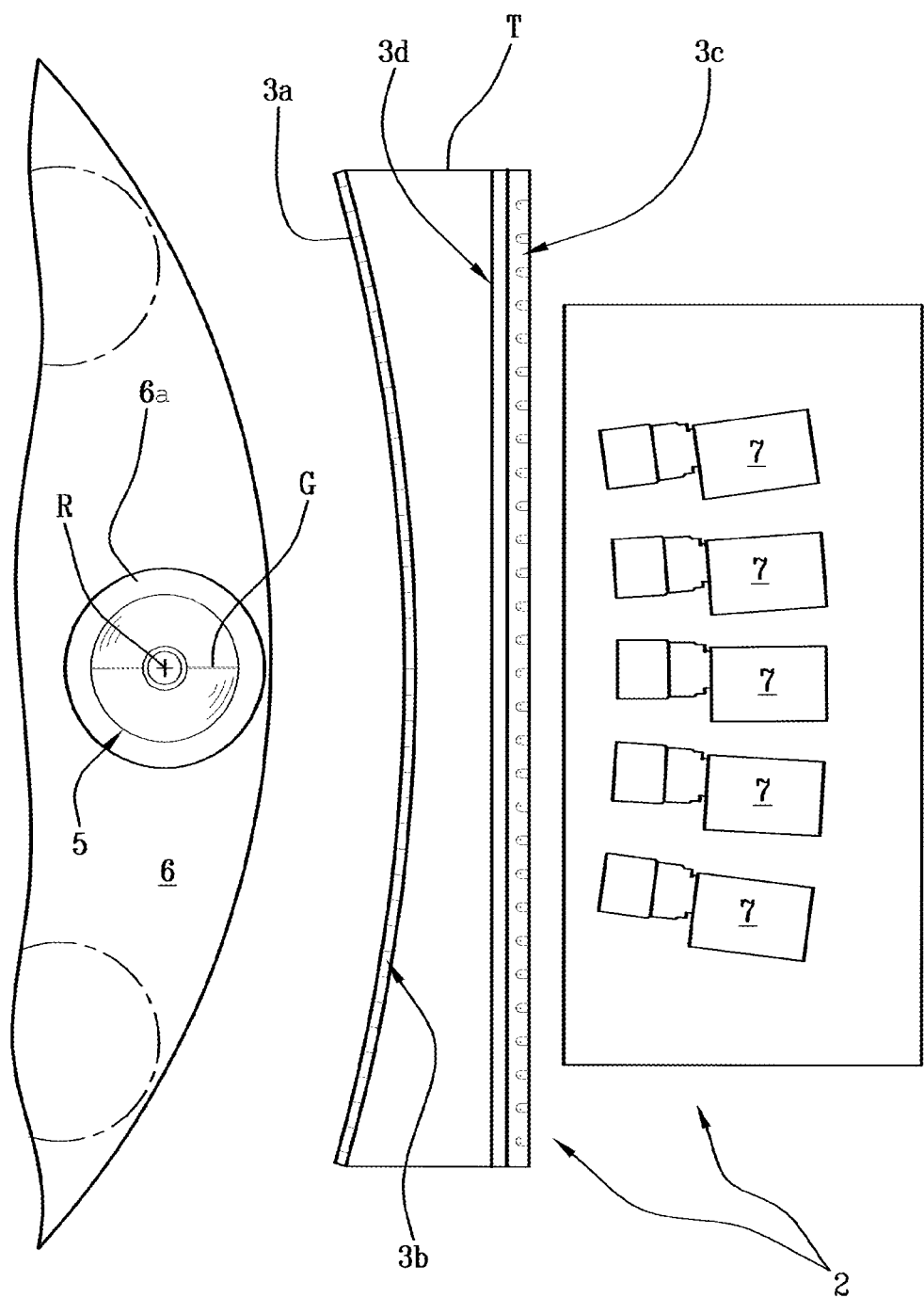
FIG. 3 is a partial view of this embodiment in the same plane as FIG. 1.

Each of the containers 5 exhibits a seam, an example of which is labelled G in FIG. 3. The seam G lies in a seam plane containing the longitudinal axis of the respective container 5.

In an embodiment of the machine according to this description, the machine 1 comprises an infeed section A, where the containers 5 feed into the carousel 6, and an outfeed section B where the containers 5 exit the carousel 6.

In FIG. 1, the arrow Y indicates the movement of the containers 5 towards the infeed section A and the arrow Z, the movement of the containers 5 away from the outfeed section B.

In an embodiment of the machine according to this description, the machine 1 comprises at least one labelling unit E.

Figure 2:
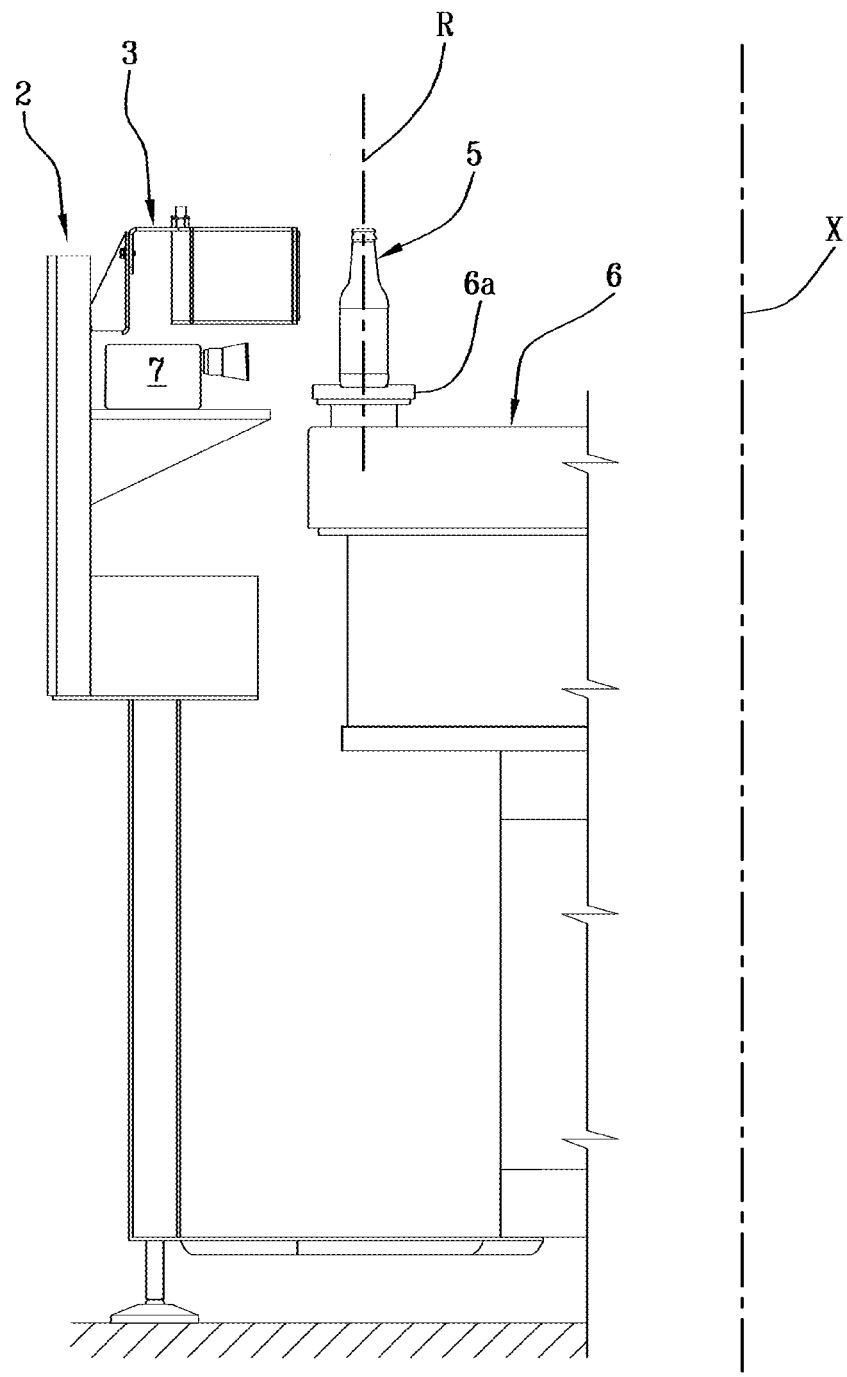
FIG. 2 is a partial view of this embodiment in a plane at right angles to that of FIG. 1.

The machine 1 comprises a carousel 6 which rotates about a central axis of rotation X, shown in FIGS. 1-3.

The machine 1 comprises a plurality of supporting elements 6a, rotating about respective supporting axes, one example of which is shown in FIGS. 2 and 3. For the sake of the clarity of FIG. 1, only some of the supporting elements 6a are shown in FIG. 1.

The supporting axes of the respective supporting elements 6a are at right angles to the plane of FIGS. 1 and 3 and parallel to the plane of FIG. 2, like the central axis X.

The supporting elements 6a are configured to support respective containers while the containers 5 are in rotation about the respective supporting axes of the respective supporting elements 6a. The supporting axes operatively coincide with the longitudinal axes of the respective containers 5, as may be observed in FIG. 2 as regards the container 5 shown in FIG. 2 and as regards the supporting axis R of the respective supporting element 6a.

The supporting elements 6a are integral with the carousel 6 to transport the containers 5 along a predetermined path in rotation about the central axis X. The rotation of the carousel 6, which causes the containers 5 to be transported along the path, is indicated by the arrow F in FIG. 1.

The machine 1 comprises a plurality of actuators mounted on the carousel 6 and connected to respective supporting elements 6a to move them about the respective supporting axes.

The machine 1 comprises an optical inspection device 2.

In an example embodiment, the optical inspection device 2 is stationary relative to the carousel 6. In an example embodiment, the optical inspection device 2 is located externally of the carousel 6

The optical inspection device 2 comprises:
an illuminator 3 to light at least one sector S of the path;
at least one camera 7 to capture one or more images of the containers 5 supported by the supporting elements 6a in the sector S;
a processing or control unit C configured to process the images in order to identify the position of the respective seams G on the containers 5.

In an embodiment of the machine 1 according to this description, the optical inspection device 2 is positioned between the infeed section A and the labelling unit E. In this embodiment, the at least one labelling unit E is interposed between the device 2 and the outfeed section B.

In an embodiment of the machine 1 according to this description, the sector S of the path is included in the light field produced by the light rays exiting the illuminator 3.

In FIG. 1, the container 5, which is also labelled 5a, is an example of a container 5 which, in the operating situation of FIG. 1, is located in the sector S of the path.

The illuminator 3 comprises a light generator 3c defining a light emitting surface.

Figure 4:
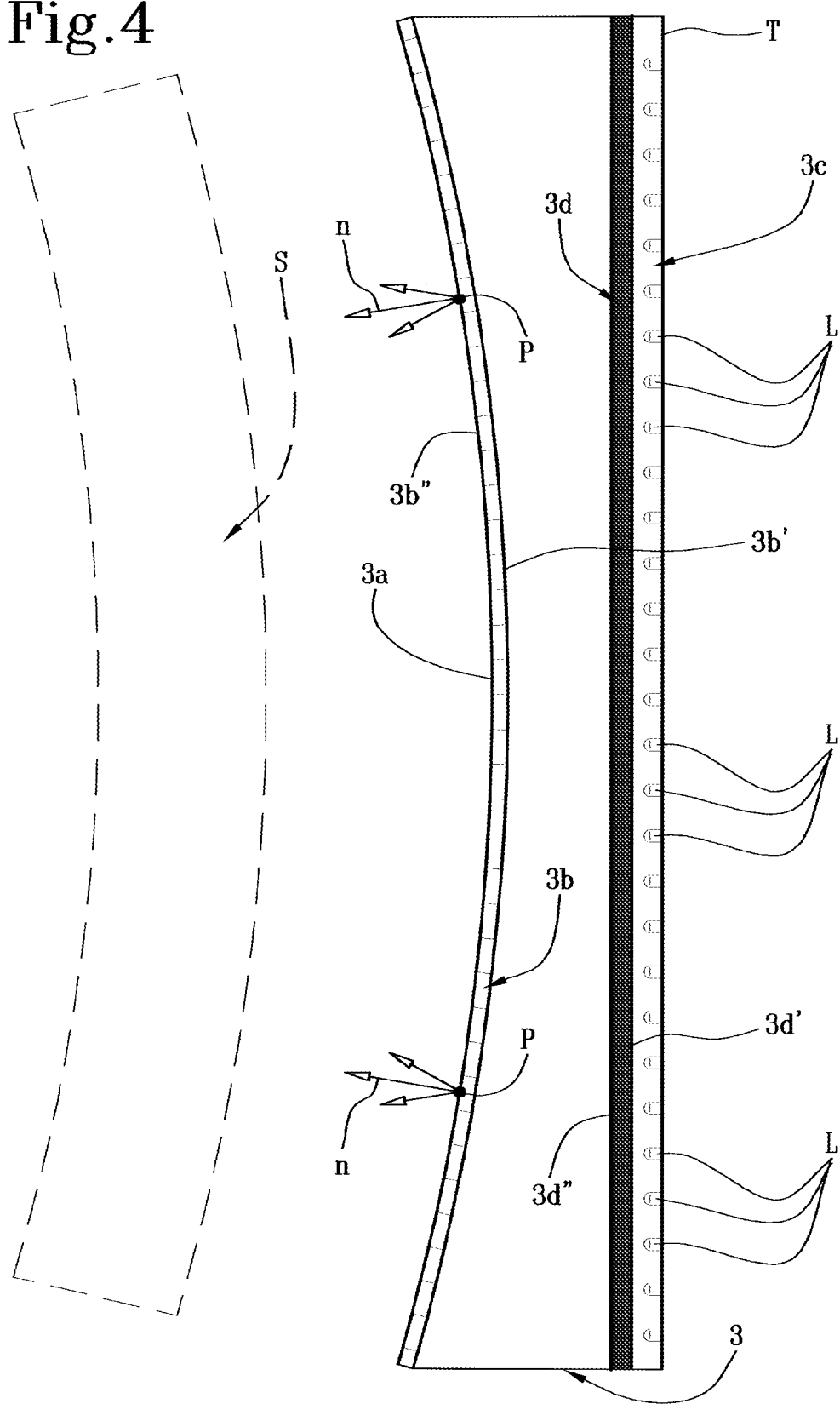
FIG. 4 illustrates an example of an illuminator which can be used in this embodiment.

In an embodiment of the machine 1 according to this description, the light generator 3c comprises a plurality of point light sources L, as shown in FIGS. 3 and 4. The plurality of point light sources L defines the emitting surface.

The plurality of light sources L are therefore preferably distributed both along a direction parallel to the plane of FIGS. 3 and 4 and along a direction at right angles to the plane of FIGS. 3 and 4.

The light sources L may be LEDs, for example.

In FIG. 1, the processing unit C is represented as a PC because it is preferably controlled by an operator using a PC.

Figure 5:
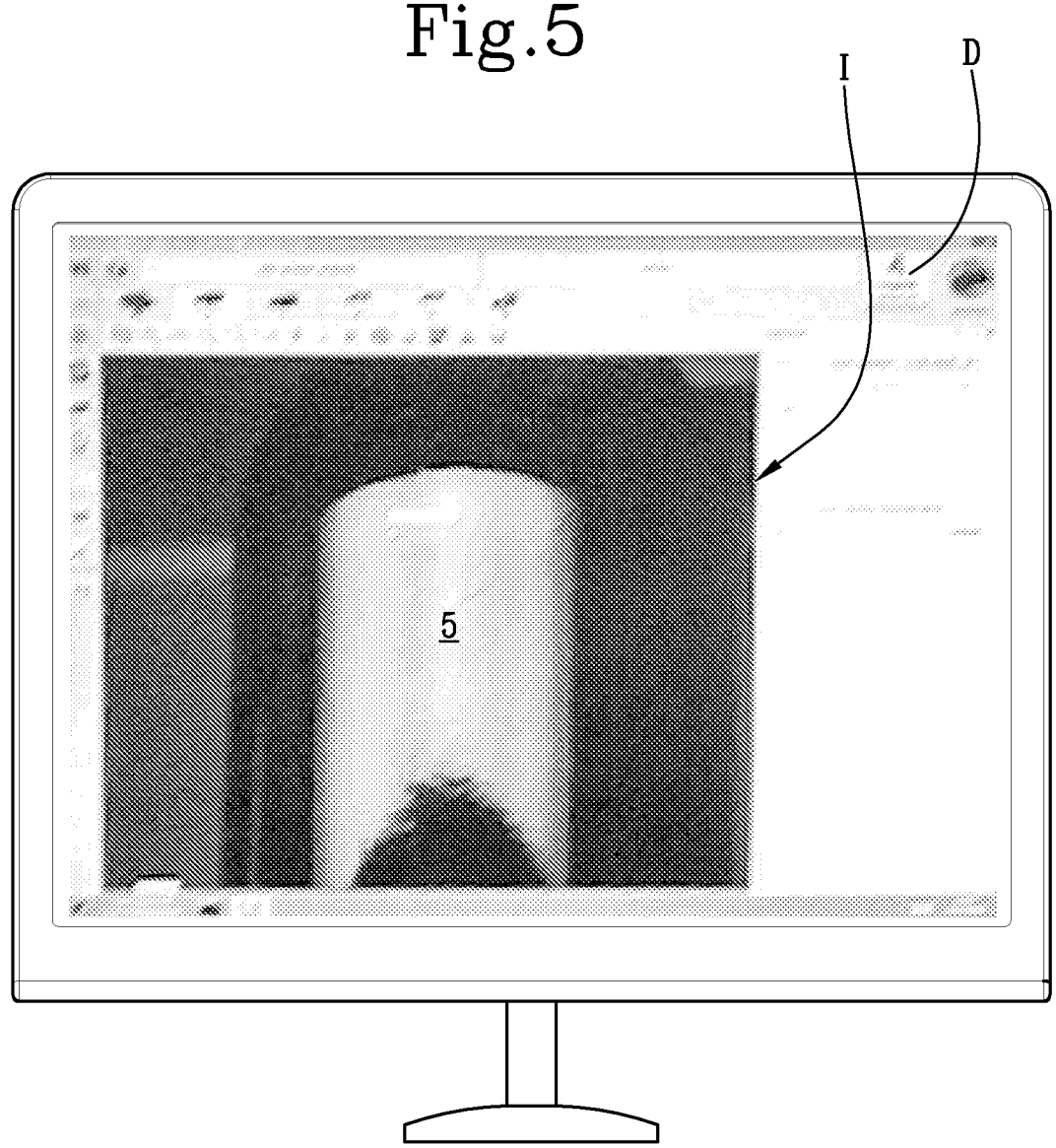
FIG. 5 shows, in particular, an example of a snapshot taken by a camera used in this embodiment.

An example of an image which can be captured by the at least one camera 7 is labelled I in FIG. 5, projected onto the desktop D of a PC.

The processing unit C is configured to process the images captured by the at least one camera 7. The processing unit C is configured to identify zones defining a light contrast in each image in order to assign relatively dark longitudinal lines to corresponding seams G on the respective container 5.

The processing or control unit C is advantageously connected to the actuators to drive or control the position of each respective supporting element 6a as a function of at least one respective control signal which can be sent by the processing unit C to each respective actuator. The purpose of driving the position of each respective supporting element 6a by the processing unit C is to align each container 5 in such a way that when it reaches the labelling unit E, its orientation—around the respective longitudinal axis and hence around the supporting axis R of the respective supporting element 6a—is suitable to allow the labelling unit E to apply at least one label on a seamless zone of the outside surface of the respective container 5.

More specifically, the processing unit C is preferably configured to derive data representing a position of the seam G in the context of each respective container 5. For example, the processing unit C may be configured to derive data representing the angular position of the seam G around the longitudinal axis of the respective container 5 and, in practice, therefore, to derive the position of the seam plane around the respective longitudinal axis.

Reflection of the rays exiting the illuminator 3 by the outside surface of the container 5 negatively affects the precision with which the position of the seam G is detected. In effect, in a snapshot taken by the camera 7, some zones in the proximity of, or even at, the seam G may be too light on account of the reflection of the rays exiting the illuminator 3 which strike the surface of the container 5 even in zones where there is no seam G and which, after being reflected back, are laid over the seam G in the image.

The illuminator 3 advantageously comprises a collimator 3b interposed between the light generator 3c and the carousel 6. The collimator 3b defines a lighting surface 3a directed towards the sector S of the path.

The collimator 3b, in the context of the light rays generated by the light generator 3c, is configured to allow through only the rays whose inclination is less than a critical angle. Such inclination must be considered as the inclination relative to corresponding planes parallel to the supporting axes of the supporting elements 6a and at right angles to the collimator 3b at the respective points of incidence of the incident light rays, the supporting axes being operatively coincident with the longitudinal axes of the respective containers 5.

The collimator 3b shown in the accompanying drawings preferably comprises a layer having a first face 3b' and a second face 3b" opposite the first face 3b'. The first face 3b' of the collimator 3b is directed towards the light generator 3c, hence towards the light emitting surface, and defines a surface of incidence for the light rays generated by the light generator 3c. The second face 3b" of the collimator 3b is directed towards the carousel 6 and defines the lighting surface 3a.

That way, the inclination of each of the light rays exiting the illuminator 3 from each respective point of the lighting surface 3a, for example one of the points P shown in FIG. 4, falls within an interval between two limit values. This inclination is defined by an angle interposed between the ray itself and a corresponding plane. The corresponding plane contains the respective exit point P and the normal n to the lighting surface 3a at that exit point P, and is parallel to the longitudinal axis of at least one of the containers 5 and, in particular, of at least one of the containers 5 which is positioned in the sector S of the path.

The limit values may, for example, be indicated by the two respective inclined arrows directed outwards from each point P in FIG. 4 on opposite sides of the arrow n which indicates the normal to the lighting surface 3a at the respective point P, the normal being contained in the corresponding plane.

The illuminator 3 is preferably configured to generate a uniform light field directed outwards from the lighting surface 3a, in order to uniformly light at least one angular sector of the outside surface of the containers 5 in transit in the sector S of the path.

The lighting surface 3a has a first extension along a direction parallel to the central axis X and a second extension positioned along a trajectory which is in turn positioned around the sector S of the path followed by the containers 5.

The trajectory along which the second extension of the lighting surface 3a is positioned is advantageously such that the lighting surface 3a surrounds the sector S of the path.

The trajectory is such as to enable the illuminator 3 to light an angular sector of the container 5, around the respective longitudinal axis, so that thanks to the rotation of the container 5 about itself as it transits the sector S of the path, the snapshots taken by the at least one camera 7 can, in their entirety, cover an angular sector of at least one hundred and eighty degrees around the longitudinal axis. In effect, the seam G usually comprises two stretches which are mutually opposite with respect to the longitudinal axis of the respective container 5.

In an embodiment of the machine 1 according to this description, the trajectory along which the second extension of the lighting surface 3a is positioned has at least one concavity.

The trajectory is preferably curved.

The curvature of the trajectory is advantageously the same as the curvature of the trajectory described by the sector S of the path. That means the outside surface of the container is very well lit at all the positions adopted by the container 5 in transit along the sector S. Thus, all the images captured by the camera 7, or the cameras 7 when there is more than one, are well lit. In an embodiment of the machine 1 according to this description, the machine 2 comprises a frame T. The collimator 3b can advantageously be removably connected to the frame T. Thus, if the machine 1 needs to be used without the collimator 3b, the collimator 3b can be removed.

In an embodiment of the machine 1 according to this description, the light generator 3c is connected to the frame T and, together with at least part of the frame T and with the collimator 3b, forms a box-shaped body.

The collimator 3b and the light generator 3c, in an embodiment of the machine 1 according to this description, are spaced from each other in such a way as to increase the uniformity with which the lighting surface 3a is lit by the emitting surface defined by the light generator 3c.

In an embodiment of the machine 1 according to this description, the illuminator 3 comprises a diffuser 3d interposed between the light generator 3c and the collimator 3b. The diffuser 3d defines a first surface 3d' directed towards the emitting surface, and a second surface 3d" directed towards the lighting surface 3a.

The diffuser 3d is positioned in such a way as to diffuse the light rays coming from the light generator 3c and directed towards the collimator 3b, so as to increase the lighting uniformity and intensity of the lighting surface 3a.

According to another aspect, this description relates to a method for labelling liquid containers 5, each of which is elongate along a respective longitudinal axis and has at least one seam G lying in a seam plane containing the longitudinal axis of the respective container 5.

The method comprises at least the following steps:

transporting a plurality of containers 5 along a path by means of a carousel 6;

rotating the containers 5 about the respective longitudinal axes while they are being transported;

lighting at least one sector S of the path by means of light rays capable of lighting the containers 5 in transit in the sector S;

capturing one or more images of each respective container 5 when it is positioned in the sector S;

processing the images to derive data therefrom representing a position of the seam G in the context of each respective container 5.

The lighting step comprises generating collimated light rays in such a way that the inclination of all the illuminating rays is less than a critical angle relative to corresponding planes which are parallel to a longitudinal direction defined by the longitudinal axis of each respective container 5, these planes being at right angles to a lighting surface 3a facing the sector S of the path.

These collimated light rays are directed outwards from the lighting surface 3a facing towards the sector S and defined by the collimator 3b. These outwardly directed rays are obtained by collimation performed by the collimator 3b on the rays coming from the light generator 3c and incident upon the collimator 3b itself.

Processing is preferably carried out by a control or processing unit C.

The purpose of processing is to identify zones defining a light contrast in each image in order to assign relatively dark longitudinal lines to corresponding seams G on the respective container 5.

The method preferably also comprises a step of sending at least one respective drive or control signal following or as a function of such processing in the context of each respective container 5.

This sending step is preferably performed by the processing unit C.

The method preferably also comprises a step of applying at least one label on each respective container 5. This application step is carried out by means of the at least one control signal so that the at least one label is applied automatically on a region or zone of the respective container 5 where there is no seam G.

Preferably, the control signal is sent to a respective actuator connected to a respective supporting element 6a in order to drive the movement of the respective supporting element 6a around a respective supporting axis, the respective supporting element 6a being configured to support a respective container 5 in rotation about the respective supporting axis which operatively coincides with the longitudinal axis of the respective container 5, the respective supporting element 6a being integral with the carousel 6.

It should be borne in mind that a machine 1 or a method according to this description can be applied to the labelling of containers 5 exhibiting any type of feature, since the seam G is an example of a feature, so that the label is applied on a zone of the container where there are no features.

This description also provides a device 2 for the optical inspection of liquid containers 5 (in particular bottles) in a machine 1 for labelling the containers.

The containers 5 are elongate along respective longitudinal axes and have a seam (defining a break in the smoothness or evenness of the outside surface of the container) lying in a seam plane containing the longitudinal axis.

The machine 1 has a mobile section and a stationary section. The labelling machine 1 is preferably a rotary machine and the movable section is a carousel 6 which rotates about a central axis of rotation X. The machine 1 has a plurality of supporting elements 6a integral with the carousel 6 and configured to support respective containers 5.

In an example of rotation, the supporting elements 6a rotate about respective supporting axes R. The supporting elements 6a are configured to support respective containers 5 whose longitudinal axes coincide with the supporting axes R of the supporting elements 6a themselves.

Preferably, the machine 1 comprises a plurality of actuators positioned on the carousel 6 and connected to corresponding supporting elements 6a to move them around the respective supporting axes.

The optical inspection device 2 can be positioned (or coupled) externally of the carousel 6. The optical inspection device 2 can be connected to a control unit of the machine 1 in order to transmit data thereto.

The optical inspection device 2 comprises an illuminator 3 to light at least one sector S of a path followed by the containers 5 moving as one with the mobile section of the labelling machine.

The optical inspection device 2 comprises one or more cameras 7 to capture one or more images I of the containers 5 positioned in the sector S (and supported by the supporting elements 6a).

The illuminator 3 and the cameras 7 are operatively positioned on the outside of the carousel 6 and are directed towards the carousel in a substantially radial direction.

The optical inspection device 2 comprises a processing unit. The processing unit is configured to process the images captured by the cameras 7 in order to identify the position of the respective seams G on each container 5. In practice, each container 5 has two seams positioned on diametrically opposite sides.

The illuminator 3 of the optical inspection device 2 comprises a light generator 3c defining a light emitting surface.

The illuminator 3 of the optical inspection device 2 comprises a collimator 3b positioned in front of the light emitting surface of the light generator 3c to intercept the light rays generated by the light generator 3c.

The collimator 3b defines a lighting surface 3a, opposite the light generator 3c, to be operatively directed towards the sector S of the path of the containers 5.

The collimator 3b, in the context of the light rays generated by the light generator 3c and incident upon the collimator 3b, is configured to block at least the rays whose inclination is greater than a critical angle relative to corresponding planes which are parallel to the supporting axes R and at right angles to the collimator 3b at the respective points of incidence of the incident light rays.

This description also provides a method for optically inspecting containers 5 moved in succession along a path defining a sector S where the containers 5 are visible to one or more cameras 7. In an example embodiment, the containers 5 are in rotation about their respective longitudinal axes as they move along the path.

The method comprises the following steps:
lighting the containers positioned in the sector S of the path;
capturing one or more images of each container 5 when it is positioned in the sector S;
processing the images captured to derive data therefrom representing a position of the seam G on the container 5.

The lighting step comprises generating collimated light rays by blocking, in the context of rays of diffuse or substantially diffuse light, (for example using a collimator or, more generally, an optical filter) the rays of light which are incident upon the collimator (or on the surface of incidence of the optical filter) and whose inclination is greater than a critical angle relative to corresponding planes parallel to the longitudinal axes of the containers and at right angles to the collimator 3b (or on the surface of incidence of the optical filter) at the respective points of incidence of the rays.

The optical inspection device 2 and the method for optically inspecting containers 5 moved in succession along a path defining a sector S may comprise one or more combinations of the features described in this description (in any combination, with reference in particular to the combinations claimed for the labelling machine and method).

The invention claimed is:

1. A labelling machine for containers for containing a liquid, each of the containers being elongate along a respective longitudinal axis and having a seam lying in a seam plane containing the longitudinal axis, wherein the machine comprises:
a carousel which rotates about a central axis of rotation;
a plurality of supporting elements, rotating about respective supporting axes and configured to support the containers in rotation about the respective supporting axes which operatively coincide with the longitudinal axes of the containers, the supporting elements being integral with the carousel to transport the containers along a predetermined path in rotation about the central axis of rotation;
a plurality of actuators mounted on the carousel and connected to respective supporting elements to move them about the respective supporting axes;
an optical inspection device having an illuminator to light at least one sector of the path, wherein a plurality of said containers is positioned in the sector, at least one camera to capture one or more images of the containers of said plurality of containers supported by the supporting elements and positioned in the sector, wherein the containers of said plurality of containers positioned in the sector are simultaneously illuminated by the illuminator and visible by the at least one camera, and a processing unit configured to process the images in order to identify the position of the respective seams on the containers of the plurality of containers, wherein the illuminator of the optical inspection device comprises:

a light generator defining a light emitting surface;

a collimator, interposed between the light generator and the carousel, defining a lighting surface which faces towards the sector of the path, and configured, for light rays generated by the light generator and incident upon the collimator, to block a portion of light the rays having an inclination that is greater than a critical angle relative to corresponding planes which are parallel to the supporting axes and at right angles to the collimator at the respective points of incidence of the incident light rays, wherein the collimator and the light generator are spaced from each other; and a diffuser, which is interposed between the light generator and the collimator, that defines a first surface directed towards the light emitting surface, and a second surface directed towards the lighting surface, in order to diffuse the light rays coming from the light generator and directed towards the collimator.

2. The labelling machine according to claim 1, wherein the lighting surface has a first extension along a direction parallel to the central axis of rotation sand a second extension positioned along a trajectory positioned around the sector of the path followed by the containers.

3. The labelling machine according to claim 2, wherein the trajectory along which the second extension of the lighting surface is positioned has at least one concavity.

4. The labelling machine according to claim 3, wherein the trajectory is curved and a first curvature thereof is the same as a second curvature of the trajectory described by the sector of the path.

5. The labelling machine according to claim 1, comprising:

an infeed section, where the containers feed into the carousel, and an outfeed section, where the containers exit the carousel;

at least one labelling unit, wherein the optical inspection device is positioned between the infeed section and the labelling unit.

6. The labelling machine according to claim 1, wherein the light generator comprises a plurality of point light sources defining the light emitting surface.

7. The labelling machine according to claim 1, wherein the optical inspection device comprises a frame and wherein the collimator is removably connected to the frame.

8. The labelling machine according to claim 7, wherein the light generator is connected to the frame and, together with the frame and the collimator, forms a box-shaped body.

9. The labelling machine according to claim 1, wherein the illuminator is configured to generate a uniform light field directed outwards from the lighting surface.

10. The labelling machine according to claim 1, wherein the processing unit is configured to process the images captured by the at least one camera and to identify zones defining a light contrast in each image in order to assign relatively dark longitudinal lines to corresponding seams on the containers of the plurality of containers.

11. The labelling machine according to claim 1, wherein the processing unit is connected to the actuators to drive or control the position of each respective supporting element as a function of at least one respective control signal which can be sent by the processing unit to each respective actuator.

12. The labelling machine according to claim 1, wherein the collimator is configured to allow passage, of only a select portion of the light rays that are perpendicular or substantially perpendicular to said corresponding planes, which are parallel to the supporting axes and at right angles to the collimator at the respective points of incidence of the incident light rays.

13. The labelling machine according to claim 1, wherein the illuminator of the optical inspection device is arranged in a stationary position with respect to the carousel.

14. The labelling machine according to claim 1, wherein said at least one sector of the path is interposed between the central axis of rotation of the carousel and the illuminator and is interposed between the central axis of rotation of the carousel and said at least one camera.

15. A method for labelling containers for containing a liquid, wherein the containers are elongate along respective longitudinal axes and each of the containers has at least one seam lying in a seam plane containing the longitudinal axis, wherein the method comprises:

transporting the containers along a path by means of a carousel;

rotating the containers about the respective longitudinal axes while they are being transported;

lighting a plurality of said containers positioned in a sector of the path, through an illuminator;

capturing one or more images of each container of the plurality of containers positioned in the sector, through at least one camera, wherein the containers of said plurality of containers positioned in the sector are simultaneously illuminated by the illuminator and visible by the at least one camera;

processing the images to derive data therefrom representing a position of the seam in a context of each container of the plurality of containers, wherein lighting the containers is carried out with a diffuser interposed between the illuminator and the collimator, wherein the diffuser defines a first surface directed towards the illuminator, and a second surface directed towards the collimator and diffuses the light rays that are coming from the illuminator and are directed towards the collimator, wherein collimated light rays are emitted by a lighting surface facing the sector of the path and whose inclination is less than a critical angle relative to corresponding planes which are parallel to a longitudinal direction defined by the longitudinal axes of the containers and at right angles to the lighting surface.

16. The method according to claim 15, wherein lighting the containers with collimated light rays comprises generating diffuse light rays and, blocking a portion of the diffuse light rays which are incident upon a surface of a collimator whose inclination is greater than a critical angle relative to corresponding planes parallel to the longitudinal axes of the containers and at right angles to the collimator at the respective points of incidence of the rays.

17. The method according to claim 15, wherein said illumination is carried out from a stationary position with respect to the movement of the containers transported by the carousel.

18. The method according to claim 15, wherein said images are obtained by acquiring, during the acquisition phase, rays reflected by the containers of the plurality of containers which are transiting in said sector of said path, wherein said rays are generated as part of lighting the containers of the plurality of containers.

19. A labelling machine for containers for containing a liquid, each of the containers being elongate along a respective longitudinal axis and having a seam lying in a seam plane containing the longitudinal axis, wherein the machine comprises:

a carousel which rotates about a central axis of rotation;

a plurality of supporting elements, rotating about respective supporting axes and configured to support the containers in rotation about the respective supporting axes which operatively coincide with the longitudinal axes of the containers, the supporting elements being integral with the carousel to transport the containers along a predetermined path in rotation about the central axis of rotation;

a plurality of actuators mounted on the carousel and connected to respective supporting elements to move them about the respective supporting axes;

an optical inspection device having an illuminator to light at least one sector of the path, at least one camera to capture one or more images of the containers supported by the supporting elements and positioned in the sector, and a processing unit configured to process the images in order to identify the position of the respective seams on the containers, wherein the illuminator of the optical inspection device comprises:

a light generator defining a light emitting surface;

a collimator, interposed between the light generator and the carousel, defining a lighting surface which faces towards the sector of the path, and configured, for light rays generated by the light generator and incident upon the collimator, to block a portion of light the rays having an inclination that is greater than a critical angle relative to corresponding planes which are parallel to the supporting axes and at right angles to the collimator at the respective points of incidence of the incident light rays, wherein the collimator and the light generator are spaced from each other; and a diffuser, which is interposed between the light generator and the collimator, that defines a first surface directed towards the light emitting surface, and a second surface directed towards the lighting surface, in order to diffuse the light rays coming from the light generator and directed towards the collimator, wherein the lighting surface has a first extension along a first direction parallel to the central axis of rotation and a second extension positioned along a trajectory which is in turn positioned around the sector of the path followed by the containers, wherein the trajectory along which the second extension of the lighting surface is positioned is such that the lighting surface surrounds the sector of the path, and wherein a plurality of snapshots is taken, by the at least one camera, of each container of the containers, which is transiting in the sector of the path.

* * * * *